United States Patent

[11] 3,549,119

| [72] | Inventor | Roger W. Sellers<br>Kenosha, Wis. |
|---|---|---|
| [21] | Appl. No. | 704,371 |
| [22] | Filed | Feb. 9, 1968 |
| [45] | Patented | Dec. 22, 1970 |
| [73] | Assignee | Webster Electric Company, Inc.<br>Racine, Wis.<br>a corporation of Delaware |

[54] VALVE ASSEMBLY WITH FLEXIBLE VALVE ELEMENT
6 Claims, 5 Drawing Figs.

[52] U.S. Cl............................................ 251/84, 251/129, 251/141
[51] Int. Cl......................................... F16k 31/06
[50] Field of Search............................ 251/141, 129, 30, 86, 88, 84, 298

[56] References Cited
UNITED STATES PATENTS

| 2,327,366 | 8/1943 | Nampa | 251/138X |
| 2,522,249 | 9/1950 | Baker | 251/138X |
| 2,675,025 | 4/1954 | Wynkoop | 251/Curtain |
| 2,750,962 | 6/1956 | Kreitchman | 251/84X |
| 2,828,936 | 4/1958 | Hales | 251/141X |
| 3,202,396 | 8/1965 | Delany et al. | 251/45X |
| 3,229,956 | 1/1966 | White | 251/11 |

FOREIGN PATENTS

| 897,639 | 11/1953 | Germany | 251/Curtain |
| 742,732 | 12/1943 | Germany | 251/129 |

Primary Examiner—Arnold Rosenthal
Attorney—Mason, Kolehmainen, Rathburn & Wyss

ABSTRACT: A housing includes a high-pressure inlet passage communicating with a pressure chamber, which in turn communicates through a valve seat with an outlet passageway. A flexible valve member is held in sealing relation against the seat when the valve is closed by the force resulting from pressure fluid within the chamber. A solenoid valve operator is energized in order to open the valve. A valve-opening member controlled by the solenoid engages the valve member and sequentially flexes portions of the valve member away from the seat, thereby avoiding the necessity of overcoming the entire sealing force at one time.

PATENTED DEC 22 1970

3,549,119

INVENTOR:
ROGER W. SELLERS
By Mason, Kolehmainen, Rathburn & Wyss
Attys.

VALVE ASSEMBLY WITH FLEXIBLE VALVE ELEMENT

The present invention relates to valves and has for an object the provision of a new and improved valve in which the force required to move the valve member away from the valve seat is reduced.

When a valve is used to control the flow of material such as fluid from a pressure source to a utilization device, the force provided by the pressurized fluid is commonly used to maintain the valve in a closed position. This may be accomplished by communicating pressurized fluid to one side of a valve seat and permitting the fluid to hold or to help to hold a valve member in sealing relation against the seat. In opening this type of valve, it is necessary to overcome the force resulting from application of pressurized fluid to the valve member. In some cases the force required to open the valve can be quite substantial, particularly where high pressure fluid is used.

In order to reduce the force required to open such a valve, it has been proposed to tilt or pivot a rigid valve member away from the seat rather than directly lifting the valve member. This approach produces a leverage action and reduces to some extent the force required to "crack" or slightly open the valve. It would be desirable, however, to provide a valve in which the force required to open the valve is reduced still more.

Accordingly, it is an object of the present invention to provide a new and improved valve in which the opening force is reduced.

Another object is to provide a novel valve with which a small operator, such as a solenoid valve operator, may be used.

Another object is to provide a new and improved valve of simple, convenient and inexpensive construction.

In brief, in accordance with the above and other objects and advantages of the invention, one embodiment of the invention may comprise a valve housing defining a valve seat. The valve may be used for controlling the flow of fluid from a pressure source to a fluid utilization device, and the housing is provided with a high-pressure passageway communicating with one side of the valve seat, and with a low-pressure passageway communicating with the other side of the seat. A flexible valve member is engageable in sealing relation against the high-pressure side of the seat, and when the valve is closed the pressure of the fluid in the high-pressure passageway produces a pressure differential acting on the valve member which tends to hold or to help to hold the valve member against the seat.

In accordance with an important feature of the present invention, and in order substantially to reduce the force required to open the valve, there is provided a valve-opening member engageable with the valve member for moving the valve member away from the seat. Rather than lifting or tilting the valve member from the seat, the valve-opening member sequentially flexes successive portions of the valve member away from the seat with a "peeling" action so that the valve member is gradually separated from the seat and it is not necessary to overcome the entire force applied to the valve member at one time.

The invention, together with the above and other objects and advantages, may be better understood from consideration of the following detailed description of one embodiment of the invention taken with the accompanying drawing in which.

Figure 1:
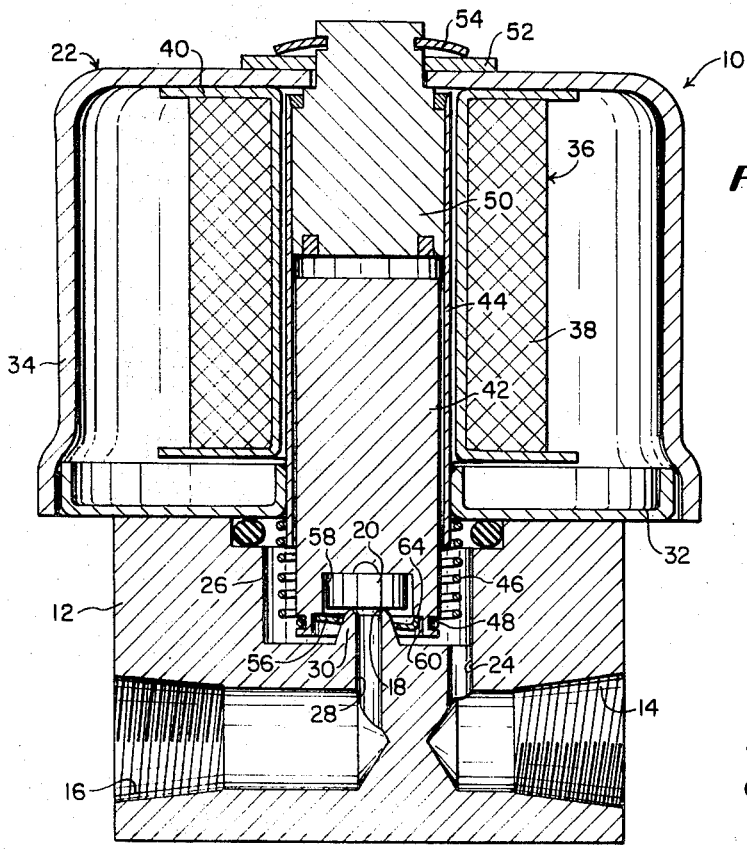
FIG. 1 is an elevational, sectional view of a valve assembly constructed in accordance with the present invention.

Having reference now to the drawing, and initially to FIG. 1, there is illustrated a valve assembly designated as a whole by the reference numeral 10 and constructed in accordance with the principles of the present invention. In general, the valve assembly 10 includes a valve body or housing 12 provided with an inlet port 14 and an outlet port 16 communicating by way of a valve seat 18. Flow through the valve seat 18 is controlled by means of a valve member 20, and in accordance with an important feature of the invention a valve operating assembly designated as a whole by the reference numeral 22 serves gradually to flex or "peels" the valve member 20 away from the valve seat 18 in order to move the valve member 20 from a closed position illustrated in FIG. 1 to an open position illustrated in FIG. 2.

Proceeding now to a more detailed description of the valve assembly 10, the valve body 12 may preferably comprise a machined metal part. The inlet port 14 may communicate, for example, by way of a suitable conduit (not shown) with a source of pressurized fluid such as a fluid pump. The inlet port 14 is connected by way of a passageway 24 with a pressure chamber 26 in the body. The pressure chamber 26 communicates with the outlet port 16 by way of the valve seat 18 and a passageway 28.

The valve seat is formed by the end or edge of an annular lip or projection 30 extending into the pressure chamber 26. In the illustrated embodiment of the invention, the valve seat 18 is circular, but any other shape could be used if desired.

The outlet port 16, for example, may communicate by way of a suitable conduit (not shown) with a fluid utilization device. In one installation, the valve assembly 10 might be used to control the flow of pressurized fluid fuel from a fluid pump to a fuel burner.

Figure 2:
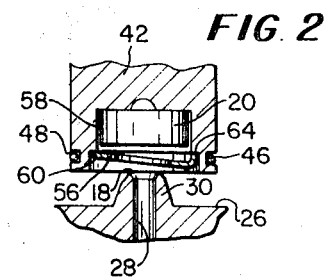
FIG. 2 is a fragmentary sectional view illustrating portions of the valve assembly in the open condition.

In order to control the opening and closing of the valve assembly 10, there is provided the valve operating assembly 22 which in the illustrated embodiment of the invention comprises a solenoid valve operator. The assembly 22 includes a housing formed of a plate 32 fastened as by bolts or the like (not shown) to the body 12 together with a cup-shaped housing member 34. A valve operating solenoid generally designated as 36 includes an annular winding 38 supported on a cylindrical bobbin 40 and connected by suitable conductors (not shown) to a control circuit for controlling the energization of the winding. A cylindrical plunger or armature 42 is slidably received within a cylindrical sleeve 44 for movement between a lower position (FIG. 1) and an upper position (FIG. 2). Normally the plunger 42 is urged toward its lower position by means of a spring 46 having one end seated in a groove 48 in the armature and the other end abutting the plate 32. When the winding 38 is energized the plunger 42 is attracted toward the winding, or in an upward direction as illustrated in FIG. 1, until it seats against a stop member 50 positioned within the sleeve 44. The sleeve 44 is fastened as by brazing or the like to the plate 32 and to the stop member 50, and the member 34 is held against the plate 32 by a washer 52 and snap connector 54.

When the winding 38 is not energized, the valve assembly 10 is in the closed position illustrated in FIG. 1, and the valve member 20 seats against the valve seat 18 preventing the flow of fluid from the inlet port 14 to the outlet port 16. In this condition, the valve member 20 is held in sealing contact against the valve seat 18 by the force provided by the spring 46, and also by the weight of the armature 42, assuming that the assembly 10 is mounted in a vertical position as illustrated in the drawing.

In addition to these forces, the valve member 20 is also held against the seat 18 by a pressure differential acting against the valve member. More particularly, when the valve member is closed, the outlet side of the valve seat 18 comprising the outlet port 16 and the passageway 28 is at low pressure. Conversely, the inlet side of the valve seat comprising the inlet port 14, the passageway 24 and the chamber 26 are at high pressure by virtue of being directly connected to a source of pressurized fluid. Accordingly, the area of the underside of the valve surface within the valve seat 18 is subject to low pressure while the remainder of the surface area of the valve member is subject to high pressure. Because of this pressure differential, there is a force acting on the valve member for sealing the member against the seat, this force being equal to the product of the fluid pressure differential and the area enclosed within the valve seat.

In order to open the valve assembly 10 by moving the valve member 20 away from the seat 18, it is necessary to overcome the force caused by the pressure differential. In known arrangements wherein a valve member is lifted directly away from a seat, or is tilted away from a seat, the entire line or region of contact between the valve member and seat is opened at one time, and as a result, the entire sealing force must be overcome at one time.

In order to overcome this problem and to provide a valve assembly which can be opened with less force, there is provided the flexible valve member 20 together with a novel valve opening member 56 which, in accordance with an important feature of the invention, flexes or "peels" the valve member away from the seat thereby to remove sequential portions of the valve member from the seat. Since the valve member is moved from the seat gradually rather than at one time, the maximum force required at any given time is opening the valve is greatly reduced. As a result, the valve may be provided with a smaller and less powerful valve operator than has been required in the past.

More specifically, the valve member 20 may be formed of any flexible material such as flexible, resilient rubber, plastic or the like. The end of the plunger or armature 42 is provided with a recess 58 into which the valve member 20 fits when the plunger is in its normal, valve closing position. A somewhat larger portion 60 of the recess surrounds the recess 58 and the valve opening member 56 is supported in the portion 60.

Figure 5:
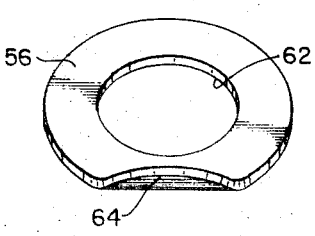
FIG. 5 is an enlarged perspective view illustrating the valve opening member.

Having reference now to FIG. 5, the valve opening member 56 comprises a washerlike annular member having a central recess 62 providing a clearance for the lip or projection 30 defining the valve seat. One edge portion 64 of the member 56 is offset at an angle, as by bending, so that the member 56 lies in the recess 60 at an angle with respect to the plane of the valve seat and with respect to the valve member 20. The valve-opening member 56 may be secured in the recess 60 in any desired manner. For example, the member 56 may have a diameter such that it has an interference fit with the wall of the recess 60 and may be staked in place within the recess.

Figure 3:
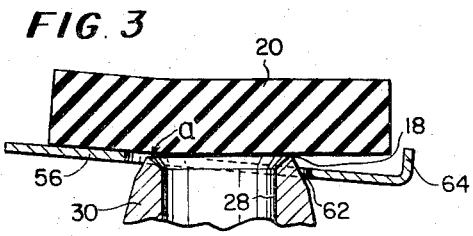
FIG. 3 is a fragmentary sectional view on an enlarged scale illustrating portions of the valve assembly as the valve is slightly open or "cracked"
Figure 4:
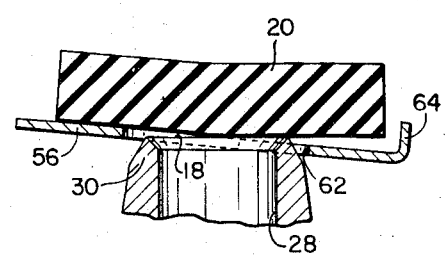
FIG. 4 is a view similar to FIG. 3 illustrating portions of the valve assembly at a subsequent point in the valve opening operation.

Referring now more particularly to FIGS. 3 and 4, when the winding 38 is energized, the plunger 42 is accelerated and moved in an upward direction as illustrated in the drawings. Since the valve-opening member 56 is initially spaced from the valve member 20, the armature is free to accelerate during the initial portion of its travel. When the member 56 contacts the valve member 20, the valve member begins to flex due to its flexible property. After a period of additional travel of the plunger 42, the member 56 reaches the position illustrated in FIG. 3 wherein the valve member 20 is beginning to be lifted from the valve seat 18. As appears clearly in FIG. 3, the valve member 20 is removed from the seat 18 only at a very small area labeled $a$ in FIG. 3. Since the entire contact between the valve member and the valve seat is not broken at one time, the force required to slightly open or to "crack" the valve is very small. In other words, it is not necessary to overcome the force created by the pressure differential over the entire area enclosed by the valve seat. Rather it is necessary only to overcome the force of pressure exerted on the very small area $a$.

As the member 56 continues to move, the valve member 20 is flexed so that sequential portions of the valve member are lifted from the valve seat. In this manner the valve member 20 is lifted gradually away from progressive portions of the valve seat. For example, referring to FIG. 4, it can be seen that at a subsequent point in the valve opening operation more than half of the seat is exposed and the valve member is in contact with the seat throughout a portion of its periphery.

Although the present invention has been described with reference to a particular embodiment thereof, numerous other modifications and embodiments may be devised by those skilled in the art which fall within the spirit and scope of the invention. It should be understood that details of the described embodiment do not limit the invention except as set forth in the following claims.

I claim:

1. A valve assembly comprising:
   a housing including a valve seat;
   a high-pressure passageway communicating with one side of said seat and a low-pressure passageway communicating with the other side of said seat;
   a flexible valve member engageable in sealing relation against said one side of said seat; and
   a valve opening member engageable with said valve member for sequentially flexing portions of said valve member away from said seat in order to open the valve against the force applied to the valve member by pressure at said one side of said seat;
   said valve opening member comprising an element mounted for movement in a direction normal to the plane of said valve seat, said element having a valve lifting surface engageable with said valve member and inclined with respect to the plane of said valve seat.

2. In combination:
   a valve body including a wall;
   an annular projection extending from said wall;
   a valve seat on said projection;
   a passageway surrounded by said valve seat and extending into said wall;
   a flexible valve member engageable with said valve seat and having a diameter greater than the diameter of said projection so as to extend beyond said projection;
   a valve-lifting member normally surrounding said projection and disposed between said valve member and said wall; and
   means for moving said valve-lifting member away from the wall and against said valve member to lift said valve member away from said valve seat; and
   said valve-lifting member being constructed and arranged to flex sequential portions of said valve member away from said valve seat.

3. The combination of claim 2, said valve-lifting member having a surface engageable with said valve member, said surface being inclined with respect to the plane of said valve seat.

4. The combination of claim 2, said means comprising a solenoid winding, and a plunger connected to said valve-lifting member.

5. The combination of claim 4, said valve-lifting member being spaced from said valve member in said normal position.

6. The combination of claim 5, said plunger having a recess defining an annular wall surrounding said valve member, and said valve-lifting member comprising a washerlike element supported within said recess.